United States Patent
Ma

(10) Patent No.: US 12,499,798 B2
(45) Date of Patent: Dec. 16, 2025

(54) DATA PROCESSING DEVICE AND CONTROL METHOD THEREOF, AND DISPLAY DEVICE

(71) Applicant: BOE TECHNOLOGY GROUP CO., LTD., Beijing (CN)

(72) Inventor: Xitong Ma, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 896 days.

(21) Appl. No.: 17/772,837

(22) PCT Filed: May 25, 2021

(86) PCT No.: PCT/CN2021/095674
§ 371 (c)(1),
(2) Date: Apr. 28, 2022

(87) PCT Pub. No.: WO2022/246626
PCT Pub. Date: Dec. 1, 2022

(65) Prior Publication Data
US 2024/0161668 A1    May 16, 2024

(51) Int. Cl.
G09G 3/20    (2006.01)
G09G 5/393    (2006.01)

(52) U.S. Cl.
CPC ............... *G09G 3/20* (2013.01); *G09G 5/393* (2013.01); *G09G 2310/08* (2013.01)

(58) Field of Classification Search
CPC ....... G09G 3/20; G09G 5/393; G09G 2310/08
See application file for complete search history.

(56) References Cited

U.S. PATENT DOCUMENTS 5,706,482 A * 1/1998 Matsushima ....... G06F 13/1673
711/100
2001/0031136 A1* 10/2001 Kawamura ...... G11B 20/00695
(Continued)

FOREIGN PATENT DOCUMENTS

CN          102067065 A       5/2011
CN          107197356 A       9/2017
(Continued)

*Primary Examiner* — Xin Sheng
(74) *Attorney, Agent, or Firm* — The Webb Law Firm

(57) ABSTRACT

The present disclosure provides a data processing device and control method thereof, and a display device. The data processing method includes: a write controller configured to write video image data and human-machine interaction interface information into a memory; a first read controller configured to read the video image data from the memory; a second read controller configured to read the human-machine interaction interface information from the memory; a superimposer configured to superimpose the video image data and the human-machine interaction interface information to obtain target image information; and a command controller configured to control the write controller to write the human-machine interaction interface information into the memory and turn on the superimposer after receiving a turn-on command, and control the write controller to stop writing the human-machine interaction interface information into the memory and turn off the superimposer after receiving a turn-off command.

14 Claims, 5 Drawing Sheets

(56) References Cited

U.S. PATENT DOCUMENTS

2009/0317053 A1   12/2009  Morley et al.
2012/0177343 A1*   7/2012  Sasaki ................ H04N 21/4325
                                              386/E9.011
2019/0087054 A1    3/2019  Gingawa

FOREIGN PATENT DOCUMENTS

CN      110456900 A    11/2019
CN      111464783 A     7/2020

* cited by examiner

DATA PROCESSING DEVICE AND CONTROL METHOD THEREOF, AND DISPLAY DEVICE

CROSS-REFERENCE TO RELATED APPLICATIONS

This application is the United States National phase of International Patent Application No. PCT/CN2021/095674, filed on May 25, 2021, the disclosure of which is hereby incorporated by reference in its entirety.

TECHNICAL FIELD

The present disclosure relates to a data processing device and a control method thereof, and a display device.

BACKGROUND

Since monitor systems can replace films to provide high quality images, their application in the fields of radio, medical, etc. becomes more and more popular in recent years. In the related art, a processing mode of the monitor system is that a human-machine interaction interface synchronizes with video image data via memory, and controls whether to display an image by a SOC (System On Chip). During a non-display period of the monitor system, the human-machine interaction interface still access the memory in real time, resulting in a high power consumption of FPGA (Field Programmable Gate Array) in the monitor system.

SUMMARY

According to an aspect of embodiments of the present disclosure, there is provided a data processing device, comprising: a write controller configured to write video image data and human-machine interaction interface information into a memory; a first read controller configured to read the video image data from the memory; a second read controller configured to read the human-machine interaction interface information from the memory; a superimposer configured to superimpose the video image data received from the first read controller and the human-machine interaction interface information received from the second read controller to obtain target image information; and a command controller configured to control the write controller to write the human-machine interaction interface information into the memory and turn on the superimposer after receiving a turn-on command, and control the write controller to stop writing the human-machine interaction interface information into the memory and turn off the superimposer after receiving a turn-off command.

In some embodiments, the data processing device further comprises: a first timing generator configured to generate a first timing control signal for controlling a read operation of the first read controller; and a second timing generator configured to generate a second timing control signal for controlling a read operation of the second read controller.

In some embodiments, the command controller comprises: a command detection module configured to receive the turn-on command and output a turn-on signal; a first counter configured to count a frame synchronization signal of the human-machine interaction interface information in a first count manner and control the write controller to write the human-machine interaction interface information into the memory according to a first count value in response to the turn-on signal; and a second counter configured to count a frame synchronization signal of the first timing control signal in a second count manner and turn on the second timing generator and the superimposer according to the first count value received from the first counter and a second count value in response to the turn-on signal.

In some embodiments, the command detection module is further configured to receive the turn-off command and output a turn-off signal; the first counter is further configured to count the frame synchronization signal of the human-machine interaction interface information in a third count manner and control the write controller to stop writing the human-machine interaction interface information into the memory according to a third count value in response to the turn-off signal; and the second counter is further configured to count the frame synchronization signal of the first timing control signal in a fourth count manner and turn off the second timing generator and the superimposer according to a fourth count value in response to the turn-off signal.

In some embodiments, the superimposer is further configured to delay the video image data by a predetermined time to align time of the video image data with time of the human-machine interaction interface information, and superimpose delayed video image data and the human-machine interaction interface information in the superimposing of the video image data and the human-machine interaction interface information.

In some embodiments, the write controller comprises: a first write controller configured to write the video image data into the memory; and a second write controller configured to write the human-machine interaction interface information into the memory.

In some embodiments, the first counter is configured to turn on the second write controller when the first count value is a first preset value, and turn off the second write controller when the third count value is a second preset value; and the second counter is configured to turn on the second timing generator and the superimposer when the first count value is greater than the first preset value and the second count value changes, and turn off the second timing generator and the superimposer when the fourth count value is a third preset value.

In some embodiments, the first count manner is the same as the second count manner, the third count manner is the same as the fourth count manner, and the first count manner is opposite to the third count manner.

In some embodiments, the data processing device further comprises: a first receiving module configured to receive the video image data and transmit the video image data to the first write controller; a second receiving module configured to receive the human-machine interaction interface information, transmit the human-machine interaction interface information to the second write controller, and transmit the frame synchronization signal of the human-machine interaction interface information to the first counter; and a third receiving module configured to receive the turn-on command or the turn-off command and transmit the turn-on command or the turn-off command to the command detection module.

In some embodiments, the data processing device further comprise: a sending module configured to send the target image information to a display panel.

According to another aspect of embodiments of the present disclosure, there is provided a display device comprising the data processing device described above.

According to another aspect of embodiments of the present disclosure, there is provided a control method for a data processing device, comprising: controlling a write controller to write human-machine interaction interface information into a memory and turning on a superimposer, by a command controller, after receiving a turn-on command; reading video image data from the memory by a first read controller; reading the human-machine interaction interface information from the memory by a second read controller; superimposing the video image data received from the first read controller and the human-machine interaction interface information received from the second read controller to obtain target image information by a superimposer; and controlling the write controller to stop writing the human-machine interaction interface information into the memory and turning off the superimposer, by the command controller, after receiving a turn-off command.

In some embodiments, the control method further comprises: generating a first timing control signal for controlling a read operation of the first read controller by a first timing generator before reading the video image data from the memory by the first read controller; and generating a second timing control signal for controlling a read operation of the second read controller by a second timing generator before reading the human-machine interaction interface information from the memory by the second read controller.

In some embodiments, the controlling of the write controller to write human-machine interaction interface information into a memory and the turning on of the superimposer, by the command controller, after receiving the turn-on command comprises: receiving the turn-on command and outputting a turn-on signal by a command detection module; counting a frame synchronization signal of the human-machine interaction interface information in a first count manner and controlling the write controller to write the human-machine interaction interface information into the memory according to a first count value, by a first counter, in response to the turn-on signal; and counting a frame synchronization signal of the first timing control signal in a second count manner and turning on the second timing generator and the superimposer according to the first count value received from the first counter and a second count value, by a second counter, in response to the turn-on signal.

In some embodiments, the controlling of the write controller to stop writing the human-machine interaction interface information into the memory and the turning off of the superimposer, by the command controller, after receiving the turn-off command comprises: receiving the turn-off command and outputting a turn-off signal by the command detection module; counting the frame synchronization signal of the human-machine interaction interface information in a third count manner and controlling the write controller to stop writing the human-machine interaction interface information into the memory according to a third count value, by the first counter, in response to the turn-off signal; and counting the frame synchronization signal of the first timing control signal in a fourth count manner and turning off the second timing generator and the superimposer according to a fourth count value, by the second counter, in response to the turn-off signal.

In some embodiments, the superimposing of the video image data and the human-machine interaction interface information by the superimposer comprises: delaying the video image data by a predetermined time to align time of the video image data with time of the human-machine interaction interface information, and superimposing delayed video image data and the human-machine interaction interface information, by the superimposer, in the superimposing of the video image data and the human-machine interaction interface information.

In some embodiments, the controlling of the write controller to write the human-machine interaction interface information into the memory comprises: writing the video image data into the memory by a first write controller; and writing the human-machine interaction interface information into the memory by a second write controller.

In some embodiments, the second write controller is turned on when the first count value is a first preset value, and the second write controller is turned off when the third count value is a second preset value, by the first counter; and the second timing generator and the superimposer are turned on when the first count value is greater than the first preset value and the second count value changes, and the second timing generator and the superimposer are turned off when the fourth count value is a third preset value, by the second counter.

According to another aspect of embodiments of the present disclosure, there is provided a data processing device, comprising: a storage device; a processor coupled to the storage device, the processor configured to, based on instructions stored in the storage device, carry out the method described above.

According to another aspect of embodiments of the present disclosure, there is provided a non-transitory computer readable storage medium having stored thereon computer program instructions which, when executed by a processor, implement the method described above.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which constitute a portion of this specification, illustrate embodiments of the present disclosure and, together with the description, serve to explain the principles of the present disclosure.

The present disclosure will be more clearly understood from the following detailed description with reference to the accompanying drawings, in which.

Figure 1:
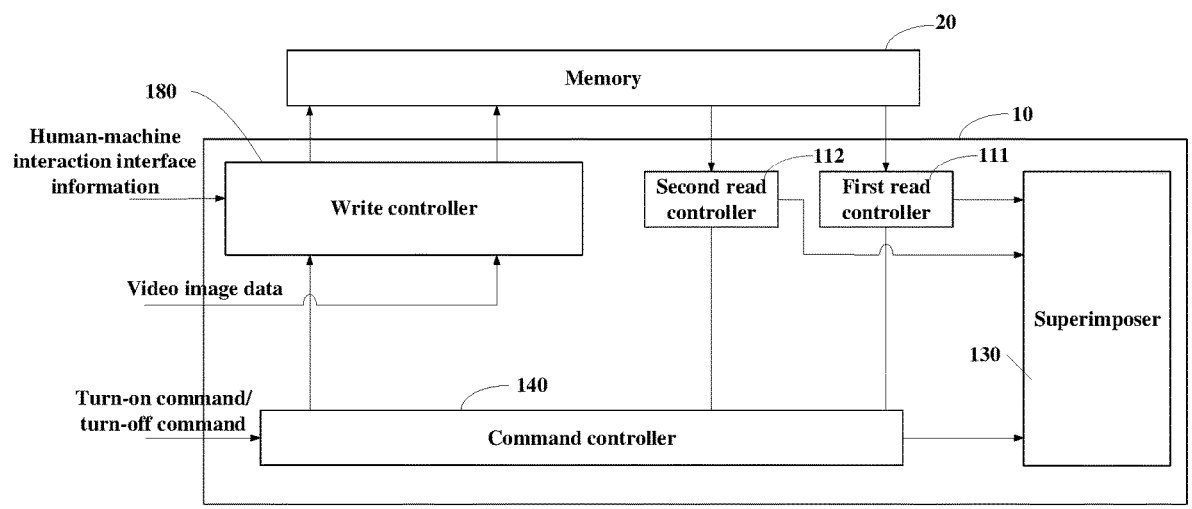
FIG. 1 is a schematic structural diagram showing a data processing device according to an embodiment of the present disclosure.

It should be understood that the dimensions of various parts shown in the accompanying drawings are not necessarily drawn according to actual proportional relations. In addition, the same or similar reference signs are used to denote the same or similar components.

DETAILED DESCRIPTION

Various exemplary embodiments of the present disclosure will now be described in detail in conjunction with the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "include", or the like means that the element before the word covers the element(s) listed after the word without excluding the possibility of also covering other elements. The terms "up", "down", "left", "right", or the like are used only to represent a relative positional relationship, and the relative positional relationship may be changed correspondingly if the absolute position of the described object changes.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (comprising technical and scientific terms) used in the present disclosure have the same meanings as understood by those skilled in the art of the present disclosure unless otherwise defined. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

FIG. 1 is a schematic structural diagram showing a data processing device according to an embodiment of the present disclosure. For example, the data processing device is an FPGA device.

As shown in FIG. 1, the data processing device 10 comprises a write controller 180, a first read controller 111, a second read controller 112, a superimposer 130, and a command controller 140. In addition, a memory 20 is also shown in FIG. 1. As shown in FIG. 1, the write controller 180 is electrically connected to the command controller 140 and the memory 20, respectively. The first read controller 111, the second read controller 112 and the command controller 140 are electrically connected to the superimpoter 130, respectively.

The write controller 180 is configured to write video image data and human-machine interaction interface information into the memory 20.

The first read controller 111 is configured to read the video image data from the memory 20. For example, the first read controller 111 is a read DDR (Double Data Rate) control module.

The second read controller 112 is configured to read the human-machine interaction interface information from the memory 20. For example, the second read controller 112 is a read DDR control module.

The superimposer 130 is configured to superimpose the video image data received from the first read controller 111 and the human-machine interaction interface information received from the second read controller 112 to obtain target image information. That is, the superimposer 130 can superimpose a video image and a human-machine interaction interface.

The command controller 140 is configured to control the write controller 180 to write the human-machine interaction interface information into the memory 20 and turn on the superimposer 130 after receiving a turn-on command, and control the write controller 180 to stop writing the human-machine interaction interface information into the memory 20 and turn off the superimposer 130 after receiving a turn-off command. Here, when the command controller receives the turn-on command, it indicates the start of a display operation, i.e., the beginning of a display period; when the turn-off command is received, it indicates the display operation is no longer performed, i.e., the beginning of a non-display period.

Heretofore, a data processing device according to some embodiments of the present disclosure is provided. The data processing device comprises a write controller, a first read controller, a second read controller, a superimposer, and a command controller. In the data processing device, during a display period, the write controller is controlled to write human-machine interaction interface information into the memory and the superimposer is turned on by the command controller; and during a non-display period, the write controller is controlled to stop writing the human-machine interaction interface information into the memory and the superimposer is turned off by the command controller. In this way, superimposed displaying of the human-machine interaction interface information and the video image can be achieved during the display period of the display device, and the occupation of the memory by the human-machine interaction interface information can be released during the non-display period of the display device, so that the power consumption of the data processing device (e.g., FPGA device) during the non-display period is reduced without affecting the display of the human-machine interaction interface information.

Figure 2:
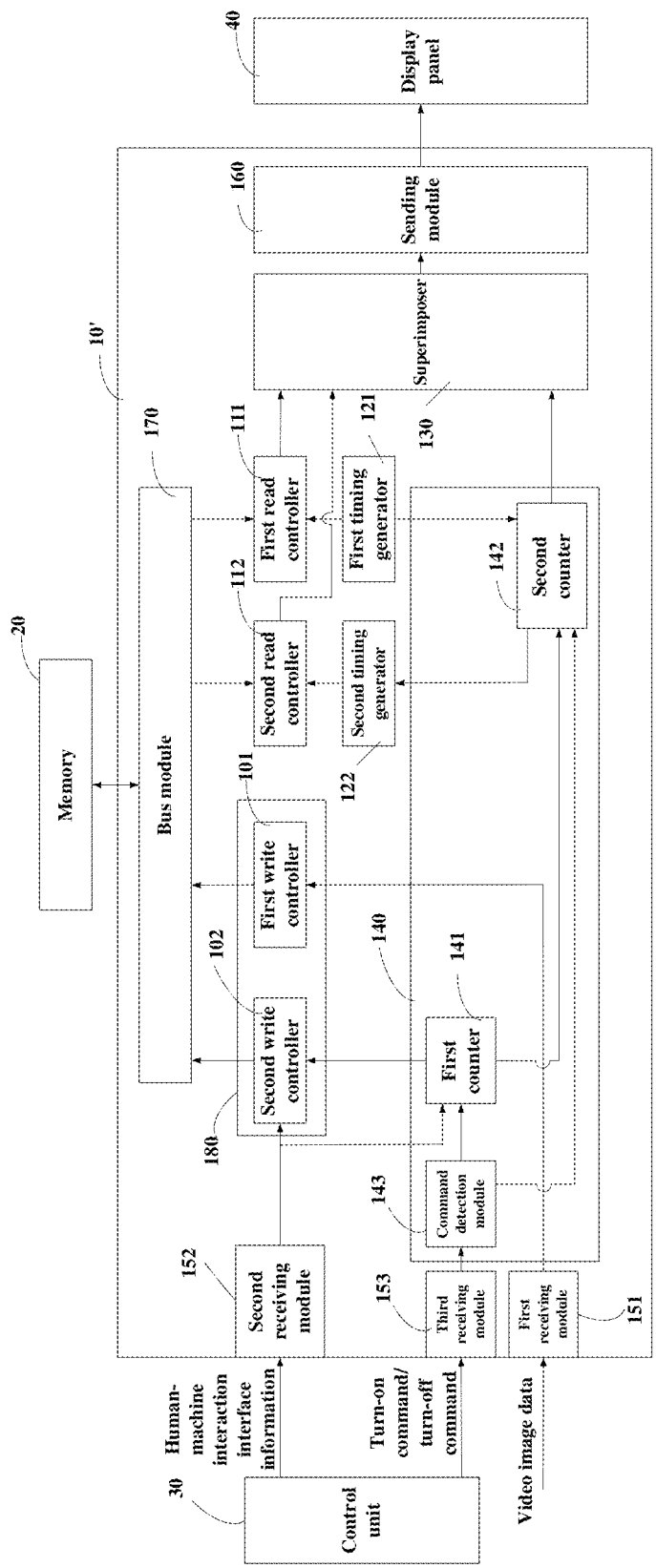
FIG. 2 is a schematic structural diagram showing a display device according to an embodiment of the present disclosure.

FIG. 2 is a schematic structural diagram showing a display device according to an embodiment of the present disclosure.

As shown in FIG. 2, the display device comprises a data processing device 10'. Similar to the aforementioned data processing device 10, the data processing device 10' comprises a write controller 180, a first read controller 111, a second read controller 112, a superimposer 130, and a command controller 140.

In some embodiments, the write controller 180 comprises a first write controller 101 and a second write controller 102. The first write controller 101 and the second write controller 102 each are electrically connected to the memory 20.

The first write controller 101 is configured to write video image data into the memory 20. Here, the first write controller can write video image data into the memory 20 in real time. For example, the first write controller 101 is a write DDR control module.

The second write controller 102 is configured to write human-machine interaction interface information into the memory 20. For example, the second write controller 102 is a write DDR control module.

In some embodiments, the data processing device 10' further comprises a first timing generator 121 and a second timing generator 122. The first timing generator 121 is electrically connected to the first read controller 111 and the command controller 140, respectively. The second timing generator 122 is electrically connected to the second read controller 112 and the command controller 140, respectively.

The first timing generator 121 is configured to generate a first timing control signal for controlling a read operation of the first read controller 111. The first timing generator 121 is an output-side timing generation module.

The second timing generator 122 is configured to generate a second timing control signal for controlling a read operation of the second read controller 112. The second timing generator 122 is an output-side timing generation module.

In some embodiments, the command controller 140 is configured to turn on the second write controller 102, the second timing generator 122, and the superimposer 130 after receiving a turn-on command, and turn off the second write controller 102, the second timing generator 122 and the superimposer 130 after receiving a turn-off command. As described above, when the command controller receives the turn-on command, it indicates the start of a display operation, i.e., the beginning of a display period; when the turn-off command is received, it indicates the display operation is no longer performed, i.e., the beginning of a non-display period.

Here, through turning on the second write controller 102, the second write controller 102 is enabled to write human-machine interaction interface information into the memory 20; through turning on the second timing generator 122, the second timing generator 122 is enabled to generate a second timing control signal, wherein the second timing control signal is transmitted to the second read controller 112 such that the second read controller 112 begins to perform a read operation; through turning on the superimpoter 130, the superimpress 130 is enabled to perform a superimposing operation. In this way, superimposed displaying of the human-machine interaction interface information and the video image can be achieved during the display period of the display device.

Furthermore, through turning off the second write controller 102, the second write controller 102 stops writing human-machine interaction interface information into the memory 20, thereby releasing the occupation of the memory by the second write controller; through turning off the second timing generator 121, the second timing generator 122 stops transmitting the second timing control signal to the second read controller 112 such that the second read controller 112 stop the read operation; through turning off the superimpoter 130, the superimpress 130 stops the superimposing operation. In this way, the occupation of the memory by the human-machine interaction interface information during the non-display period of the display device can be released, so that the power consumption of the data processing device (e.g., FPGA device) during the non-display period is reduced.

Thus, in the above embodiment, superimposed displaying of the human-machine interaction interface information and the video image can be achieved during the display period of the display device, and the occupation of the memory by the human-machine interaction interface information during the non-display period of the display device can be released, so that the power consumption of the data processing device (e.g., FPGA device) during the non-display period is reduced without affecting the display of the human-machine interaction interface information.

In some embodiments, during the process of the first read controller 111 reading the video image data and the second read controller 112 reading the human-machine interaction interface information, reading time of the human-machine interaction interface information may be later than reading time of the video image. Thus, in a process of superimposing the two kinds of image data, they may not be aligned with each other. In view of this, the superimposer 130 is further configured to delay the video image data by a predetermined time to align time of the video image data with time of the human-machine interaction interface information, and superimpose delayed video image data and the human-machine interaction interface information in the superimposing of the video image data and the human-machine interaction interface information. This can solve the problem that the time of the video image data is not aligned with the time of the human-machine interaction interface information, and thereby affecting the superposition effect. It should be noted that the predetermined time described herein can be set according to actual needs or actual conditions.

In some embodiments, the command controller 140 comprises a command detection module 143, a first counter 141, and a second counter 142. The command detection module 143 is electrically connected to the first counter 141 and the second counter 142, respectively. The first counter 141 is electrically connected to the second write controller 102 and the second counter 142, respectively. The second counter 142 is electrically connected to the first timing generator 121, the second timing generator 122, and the superimposer 130, respectively.

The command detection module 143 is configured to receive a turn-on command and output a turn-on signal. For example, the command detection module 143 is a command detector or a command detection circuit.

The first counter 141 is configured to count a frame synchronization signal of the human-machine interaction interface information in a first count manner and control the write controller 180 to write the human-machine interaction interface information into the memory 20 according to a first count value in response to the turn-on signal. For example, the first counter 141 can turn on the second write controller 102 according to the first count value, so that the second write controller 102 writes the human-machine interaction interface information into the memory 20. For example, the first counter is a frame synchronization signal counter. Here, the human-machine interaction interface information comprises a frame synchronization signal. The appearance of the frame synchronization signal indicates the appearance of a frame of human-machine interaction interface image.

The second counter 142 is configured to count a frame synchronization signal of the first timing control signal in a second count manner and turn on the second timing generator 122 and the superimposer 130 according to the first count value received from the first counter and a second count value in response to the turn-on signal. For example, the second counter is a frame synchronization signal counter. Similarly, the first timing control signal also comprises a frame synchronization signal. The appearance of the frame synchronization signal indicates the appearance of a frame of video image.

In some embodiments, the first count manner is the same as the second count manner. For example, both the first count manner and the second count manner are up-count.

Through the above embodiment, it is realized that the command controller configures the write controller to write human-machine interaction interface information into the memory, and turns on the second timing generator and the superimposer after receiving a turn-on command. Here, turning on the second timing generator can cause the second read controller to perform an operation of reading the human-machine interaction interface information.

The command detection module 143 is further configured to receive a turn-off command and output a turn-off signal.

The first counter 141 is further configured to count the frame synchronization signal of the human-machine interaction interface information in a third count manner and control the write controller 180 to stop writing the human-machine interaction interface information into the memory 20 according to a third count value in response to the turn-off signal. For example, the first counter 141 can turn off the second write controller 102 according to the third count value, so that the second write controller 102 stops writing the human-machine interaction interface information into the memory 20.

The second counter 142 is further configured to count the frame synchronization signal of the first timing control signal in a fourth count manner and turn off the second timing generator and the superimposer according to a fourth count value in response to the turn-off signal.

In some embodiments, the third count manner is the same as the fourth count manner, and the first count manner is opposite to the third count manner. For example, both the third count manner and the fourth count manner are down-count.

Through the above embodiment, it is realized that the command controller configures the write controller to stop writing human-machine interaction interface information into the memory, and turns off the second timing generator and the superimposer after receiving a turn-off command. Here, turning off the second timing generator can make the second read controller no longer perform the operation of reading the human-machine interaction interface information.

In some embodiments, the first counter 141 is configured to turn on the second write controller when the first count value is a first preset value, and turn off the second write controller when the third count value is a second preset value. For example, the first preset value is smaller than the second preset value. For example, the first preset value is 1, and the second preset value is 14. Of course, those skilled in the art can understand that the first preset value and the second preset value given herein are only exemplary, and can be set to other values according to actually needs. Therefore, the scope of the present disclosure is not limited thereto.

In some embodiments, the second counter 142 is configured to turn on the second timing generator and the superimposer when the first count value is greater than the first preset value and the second count value changes, and turn off the second timing generator and the superimposer when the fourth count value is a third preset value. In some embodiments, the second preset value is equal to the third preset value. For example, both the second preset value and the third preset value are 14. Of course, those skilled in the art can understand that the second preset value and the third preset value given herein are only exemplary, and can be set to other values according to actually needs. Therefore, the scope of the present disclosure is not limited thereto. In this embodiment, through turning on the second timing generator, the second read controller can be turned on, so that the second read controller can perform a read operation. Similarly, through turning off the second timing generator, the second read controller can stop the read operation.

In the above embodiment, through the control of the command detection module, the first counter and the second counter, multiple dynamic synchronizations between human-machine interaction interface information and video image data can be realized, so that the power consumption of the display device can be reduced without affect the display effect.

In some embodiments, as shown in FIG. 2, the data processing device 10' further comprises a first receiving module 151. The first receiving module 151 is electrically connected to the first write controller 101. The first receiving module 151 is configured to receive video image data and transmit the video image data to the first write controller 101. For example, the first receiving module 151 is a first receiver or a first receiving circuit. For example, the first receiving module 151 is an SDI (Serial Digital Interface) receiving module. The SDI receiving module is used to receive professional SDI signals containing video image data in the field of radio and television.

In some embodiments, as shown in FIG. 2, the data processing device 10' further comprises a second receiving module 152. The second receiving module 152 is electrically connected to the second write controller 102 and the first counter 140. The second receiving module 152 is configured to receive human-machine interaction interface information, transmit the human-machine interaction interface information to the second write controller 102, and transmit a frame synchronization signal of the human-machine interaction interface information to the first counter 140. For example, the second receiving module 152 is a second receiver or a second receiving circuit. For example, the second receiving module 152 is an LVDS (Low-Voltage Differential Signaling) receiving module. The LVDS receiving module is used to receive LVDS video signals containing the human-machine interaction interface information.

In some embodiments, as shown in FIG. 2, the data processing device 10' further comprises a third receiving module 153. The third receiving module 153 is electrically connected to the command detection module 143. The third receiving module 153 is configured to receive a turn-on command or a turn-off command, and transmit the turn-on command or the turn-off command to the command detection module 143. For example, the third receiving module 153 is a third receiver or a third receiving circuit. For example, the third receiving module 153 is an IIC (Inter-Integrated Circuit) module.

In some embodiments, as shown in FIG. 2, the data processing device 10' further comprises a sending module 160. The sending module 160 is electrically connected to the superimposer 130 and a display panel 40, respectively. The sending module 160 is configured to send target image information received from the superimposer 130 to the display panel 40. Thus, the display panel 40 can display the superimposed target image information. For example, the sending module 160 is a transmitter or a sending circuit. For example, the sending module is a V-by-one (referred to as VBO) sending module.

In some embodiments, as shown in FIG. 2, the data processing device 10' further comprises a bus module 170. The bus module 170 is electrically connected to the memory 20, the first write controller 101, the second write controller 102, the first read controller 111, and the second read controller 112, respectively. That is, the first write controller 101, the second write controller 102, the first read controller 111, and the second read controller 112 each are electrically connected to the memory 20 via the bus module 170. For example, the bus module 170 is an AXI (Advanced eXtensible Interface) bus arbitration module.

Heretofore, a data processing device according to other embodiments of the present disclosure is provided. This data processing device (for example, FPGA device) can enable a display device to realize superimposed displaying of the human-machine interaction interface information and the video image during the display period of the display device, release the occupation of the memory by the human-machine interaction interface information during the non-display period, and realize multiple dynamic synchronizations between the human-machine interaction interface information and the video image data, so that the power consumption of the data processing device during the non-display period can be reduced without affect the display of the human-machine interaction interface information.

In some embodiments, as shown in FIG. 2, the display device further comprises a control unit 30. The control unit 30 is electrically connected to the second receiving module 152 and the third receiving module 153, respectively. The control unit 30 is configured to output human-machine interaction interface information, a turn-on command, and a turn-off command to the data processing device 10'. For example, the control unit is an SOC chip.

In some embodiments, as shown in FIG. 2, the display device further comprises the memory 20. The memory 20 is electrically connected to the bus module 170. The memory 20 is configured to store the human-machine interaction interface information and the video image data. In some embodiments, the memory is an internal memory. For example, the internal memory is the third-generation double-rate synchronous dynamic random access memory (Double Data Rate 3, also referred to as DDR3).

In some embodiments, as shown in FIG. 2, the display device further comprises a display panel 40. The display panel 40 is configured to display the target image information.

In some embodiments, the display device is a display device for a monitor.

Figure 3:
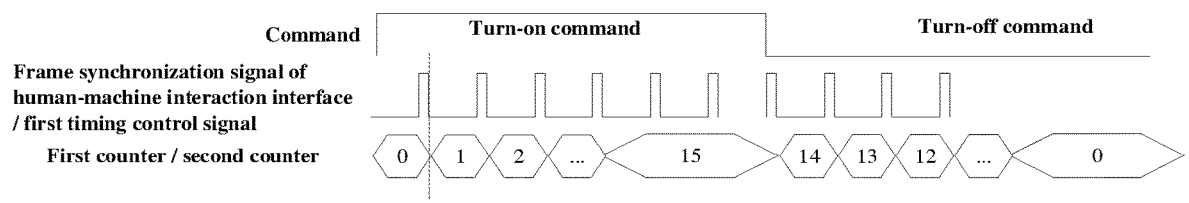
FIG. 3 is a timing control diagram showing related signals according to some embodiments of the present disclosure.
Figure 4:
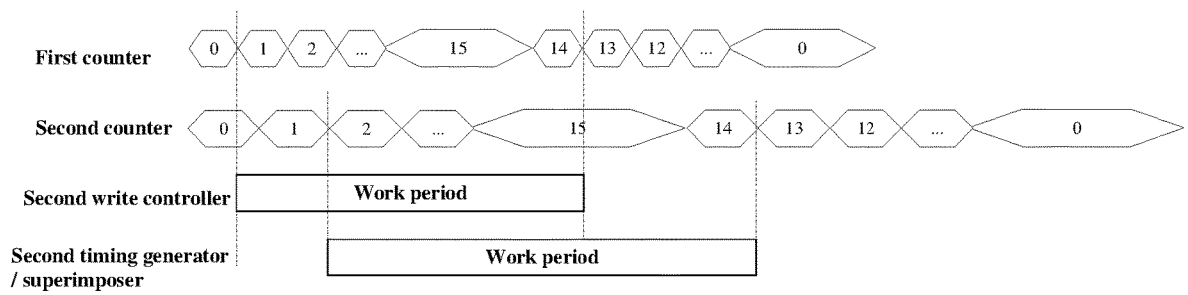
FIG. 4 is a timing control diagram showing related signals according to other embodiments of the present disclosure.

FIG. 3 is a timing control diagram showing related signals according to some embodiments of the present disclosure. FIG. 4 is a timing control diagram showing related signals according to other embodiments of the present disclosure. The operation of the data processing device according to some embodiments of the present disclosure will be described in conjunction with FIGS. 2 to 4.

First, video image data is received and is written to a memory and read out from the memory. As shown in FIG. 2, serial video image data is converted into parallel video image data of standard timing through the first receiving module 151, and the video image data is written into the memory 20 by the first write controller 101 with a channel-associated clock signal. The first timing control signal (the first timing control signal is a local clock signal) generated by the first timing generator 121 is transmitted to the first read controller 111, so that the first read controller 111 reads the video image data from the memory 20.

For example, the standard 4K timing can be adopted in the above method. Particular parameters are as follows: HTT: 4400; VTT: 2250; HAC: 3840; VAC: 2160; HFP: 176; VFP: 8; HSW: 88; VSW: 10; HBP: 296; VBP: 72.

Here, HTT represents the total number of pixel clocks in each row in the horizontal direction; HAC is the number of valid pixel clocks in each row in the horizontal direction, that is, the number of clocks during the high level period of the valid data strobe signal DE; HFP is the number of leading edge clocks in the horizontal direction, that is, the number of clocks between the falling edge of the DE signal and the rising edge of the row synchronization signal HSYNC (representing the start of the scanning of a row); HSW is the number of clocks during the high level period of the HSYNC signal in the horizontal direction; HBP is the number of trailing edge clocks in the horizontal direction, that is, the number of clocks between the falling edge of the HSYNC signal and the rising edge of the DE signal; VTT is the total number of rows of each frame of image in the vertical direction; VAC is the number of valid rows of each frame of image in the vertical direction; VFP is the number of leading rows in the vertical direction, that is, the number of rows between the falling edge of the last DE signal of each frame of image and the rising edge of the frame synchronization signal VSYNC (representing the start of the scanning a frame of image); VSW is the number of rows during the high level of the VSYNC signal in the vertical direction; VBP is the number of trailing-edge rows in the vertical direction, that is, the number of rows between the falling edge of the VSYNC signal and the rising edge of the first DE signal of each frame of image.

Next, the human-machine interaction interface commands are parsed, and related timing signals are generated. Usually, in most of the time, the human-machine interaction interface does not need to be displayed. This step enables the human-machine interaction interface to access the memory 20 as needed, that is, the occupation of the memory is released when the human-machine interaction interface does not need to display, and the occupation of the memory is restored and dynamic synchronization with video image data is performed when display is required. In this way, the occupation of the memory by the human-machine interaction interface is reduced, thereby reducing the power consumption of the data processing device.

The control unit 30 sends, through the third receiving module 153, a command indicating whether the human-machine interaction interface needs to be displayed (i.e., a turn-on command or a turn-off command). The timing when the third receiving module 153 starts to work is the timing when the user operates the interface, the timing when the human-machine interaction interface starts to work is the timing when the power-on initialization of the control unit 30 is completed, and the timing when the first timing generator starts to work is the timing when the initialization of the data processing device is completed. There is no fixed time relationship between these three timings. Therefore, the first counter 141 starts to count up (that is, count from a small value, for example, from 0 to a large value), for the frame synchronization signal of the human machine interface information after receiving a turn-on command (i.e., an ON command), until reaching 15, for example. The first counter 141 starts to count down (that is, count from a large value, for example, from 15 to a small value) for the frame synchronization signal of the human-machine interaction interface information after receiving a turn-off command (i.e., an OFF command), until reaching 0. The second counter 142 starts to count up (that is, count from a small value, for example, from 0 to a large value), for the frame synchronization signal of the first timing control signal of the first timing generator 121 after receiving a turn-on command, until reaching 15. The second counter 142 starts to count down (that is, count from a large value, for example, from 15 to a small value) for the frame synchronization signal of the first timing control signal after receiving a turn-off command, until reaching 0. Please refer to FIG. 3.

The above step comprises two situations:

(1) The human-machine interaction interface starts to display according to a command issued by a user. The human-machine interaction command changes from a non-display command to a display command, that is, from a turn-off command to a turn-on command. After the command detection module 143 detects the turn-on command, the first counter 141 starts to count the frame synchronization signal of the human-machine interaction interface information, and the second counter 142 starts to count the frame synchronization signal of the first timing control signal of the first timing generator 121. According to counting results of the first counter 141 and the second counter 142, the second write controller 102, the second timing generator 122 and the superimposer 130 are sequentially turned on.

For example, when the first count value of the first counter is 1, the second write controller 102 is turned on, and the second write controller 102 starts to write data of the human-machine interaction interface information into the memory 20. When the first count value is greater than 1 (that is, after a complete frame of human-machine interaction interface image has been written to the memory) and the second count value of the second counter changes (which indicates that the first read controller 111 has read one frame of video image data from the memory 20), the second timing generator 122 and the superimposer 130 are turned on synchronously. The second read controller 112 is turned on by turning on the second timing generator 122, so that the second read controller 112 reads the human-machine interaction interface image from the memory 20. In this way, the turned-on superimposer 130 can superimpose one frame of video image read by the first read controller 111 on one frame of human-machine interaction interface image read by the second read controller 112.

For example, the resolution of the video image displayed by reading the video image data using the first timing control signal is 3840×2160, and the resolution of the human-machine interaction interface image displayed by reading the human-machine interaction interface information using the second timing control signal is 1920×1080. For example, when displayed, the human-machine interaction interface image may be located in the middle of the video image and near an edge of the video image.

(2) The human-machine interaction command changes from a display command to a non-display command, that is, from a turn-on command to a turn-off command. After the command detection module 143 detects the turn-off command, the first counter 141 starts to count the frame synchronization signal of the human-machine interaction interface information, and the second counter 142 starts to count the frame synchronization signal of the first timing control signal of the first timing generator. According to counting results of the first counter 141 and the second counter 142, the superimposer 130, the second timing generator 122 and the second write controller 102 are sequentially turned off.

For example, as shown in FIG. 4, when the third count value of the first counter is the second preset value (for example, the second preset value is 14), the second write controller 102 is turned off, so that the second write controller 102 stop writing human-machine interaction interface image data into the memory 20; when the fourth count value of the second counter is the third preset value (e.g., the third preset value is 14), the second timing generator 122 and the superimposer 130 are turned off. Since the second timing generator 122 is turned off, the second timing generator 122 no longer sends the second timing control signal to the second read controller 112, so that the second read controller 112 no longer reads human-machine interaction interface information from the memory 20. In addition, after the superimposer 130 is turned off, the superimposing process is no longer performed.

Next, the sending module 160 sends the superimposed target image information to the display panel 40 for display.

Heretofore, the working process of the data processing device according to some embodiments of the present disclosure is provided. Through the working process, the data processing device can enable the display device to realize superimposed displaying of the human-machine interaction interface information and the video image during the display period, to release the occupation of the memory by the human-machine interaction interface information during the non-display period, and to realize multiple dynamic synchronizations between the human-machine interaction interface information and the video image data, so that the power consumption of the data processing device during the non-display period can be reduced without affect the display of the human-machine interaction interface information.

Figure 5:
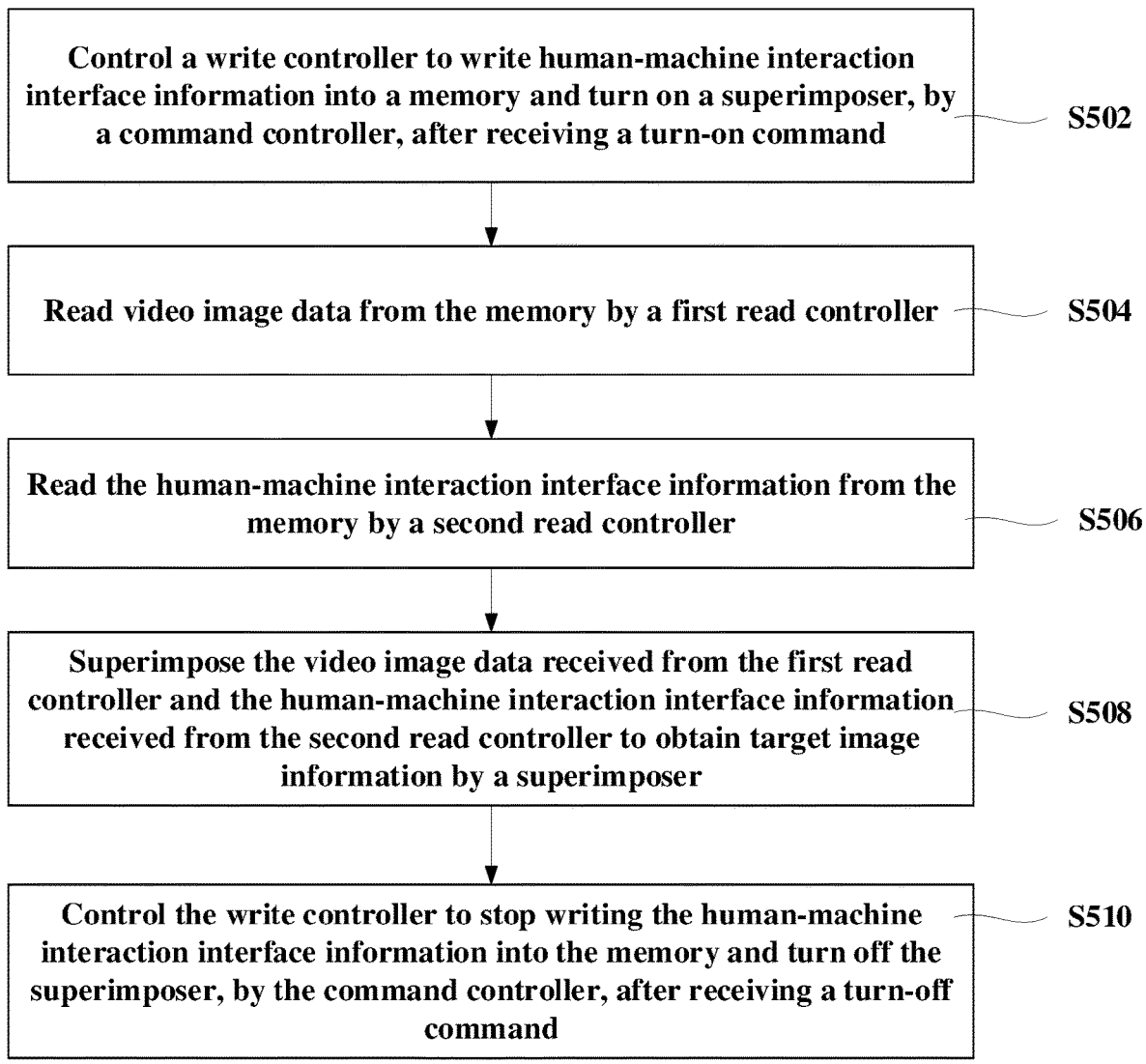
FIG. 5 is a flowchart illustrating a control method for a data processing device according to an embodiment of the present disclosure.

FIG. 5 is a flowchart illustrating a control method for a data processing device according to an embodiment of the present disclosure. As shown in FIG. 5, the control method comprises steps S502 to S510.

At step S502, a write controller is controlled to write human-machine interaction interface information into a memory and a superimposer is turned on by a command controller after receiving a turn-on command.

At step S504, video image data is read from the memory by a first read controller.

At step S506, the human-machine interaction interface information is read from the memory by a second read controller.

At step S508, the video image data received from the first read controller and the human-machine interaction interface information received from the second read controller are superimposed to obtain target image information by a superimposer.

In some embodiments, the step S508 comprises: delaying the video image data by a predetermined time to align time of the video image data with time of the human-machine interaction interface information, and superimposing delayed video image data and the human-machine interaction interface information, by the superimposer, in the superimposing of the video image data and the human-machine interaction interface information.

At step S510, the write controller is controlled to stop writing the human-machine interaction interface information into the memory and the superimposer is turned off, by the command controller, after receiving a turn-off command.

Heretofore, a control method for a data processing device according to some embodiments of the present disclosure is provided. This control method enables the display device to realize superimposed displaying of the human-machine interaction interface information and the video image during the display period of the display device, and to release the occupation of the memory by the human-machine interaction interface information during the non-display period of the display device, so that the power consumption of the data processing device (e.g., FPGA device) during the non-display period is reduced without affecting the display of the human-machine interaction interface information.

In some embodiments, the control method further comprises: sending the target image information to a display panel by a sending module.

In some embodiments, the control method further comprises: generating a first timing control signal for controlling a read operation of the first read controller by a first timing generator before reading the video image data from the memory by the first read controller; and generating a second timing control signal for controlling a read operation of the second read controller by a second timing generator before reading the human-machine interaction interface information from the memory by the second read controller.

In some embodiments, the step S502 comprises: receiving the turn-on command and outputting a turn-on signal by a command detection module; counting a frame synchronization signal of the human-machine interaction interface information in a first count manner and controlling the write controller to write the human-machine interaction interface information into the memory according to a first count value, by a first counter, in response to the turn-on signal; and counting a frame synchronization signal of the first timing control signal in a second count manner and turning on the second timing generator and the superimposer according to the first count value received from the first counter and a second count value, by a second counter, in response to the turn-on signal.

In some embodiments, the step S510 comprises: receiving the turn-off command and outputting a turn-off signal by the command detection module; counting the frame synchronization signal of the human-machine interaction interface information in a third count manner and controlling the write controller to stop writing the human-machine interaction interface information into the memory according to a third count value, by the first counter, in response to the turn-off signal; and counting the frame synchronization signal of the first timing control signal in a fourth count manner and turning off the second timing generator and the superimposer according to a fourth count value, by the second counter, in response to the turn-off signal.

In some embodiments, the controlling of the write controller to write the human-machine interaction interface information into the memory comprises: writing the video image data into the memory by a first write controller; and writing the human-machine interaction interface information into the memory by a second write controller.

In some embodiments, the second write controller is turned on when the first count value is a first preset value, and the second write controller is turned off when the third count value is a second preset value, by the first counter; and the second timing generator and the superimposer are turned on when the first count value is greater than the first preset value and the second count value changes, and the second timing generator and the superimposer are turned off when the fourth count value is a third preset value, by the second counter.

Figure 6:
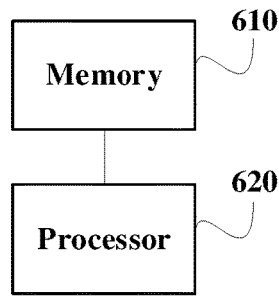
FIG. 6 is a schematic structural diagram showing a data processing device according to another embodiment of the present disclosure.

FIG. 6 is a schematic structural diagram showing a data processing device according to another embodiment of the present disclosure. The data processing device comprises a memory 610 and a processor 620. wherein:

the memory 610 may be a magnetic disk, flash memory or any other non-volatile storage medium. The memory is used to store instructions of corresponding embodiment shown in FIG. 5.

The processor 620 is coupled to the memory 610 and may be implemented as one or more integrated circuits, such as a microprocessor or microcontroller. The processor 620 is used to execute the instructions stored in the memory to enable the display device to realize superimposed displaying of the human-machine interaction interface information and the video image during the display period, and to release the occupation of the memory by the human-machine interaction interface information during the non-display period, so that the power consumption of the data processing device during the non-display period is reduced without affecting the display of the human-machine interaction interface information.

Figure 7:
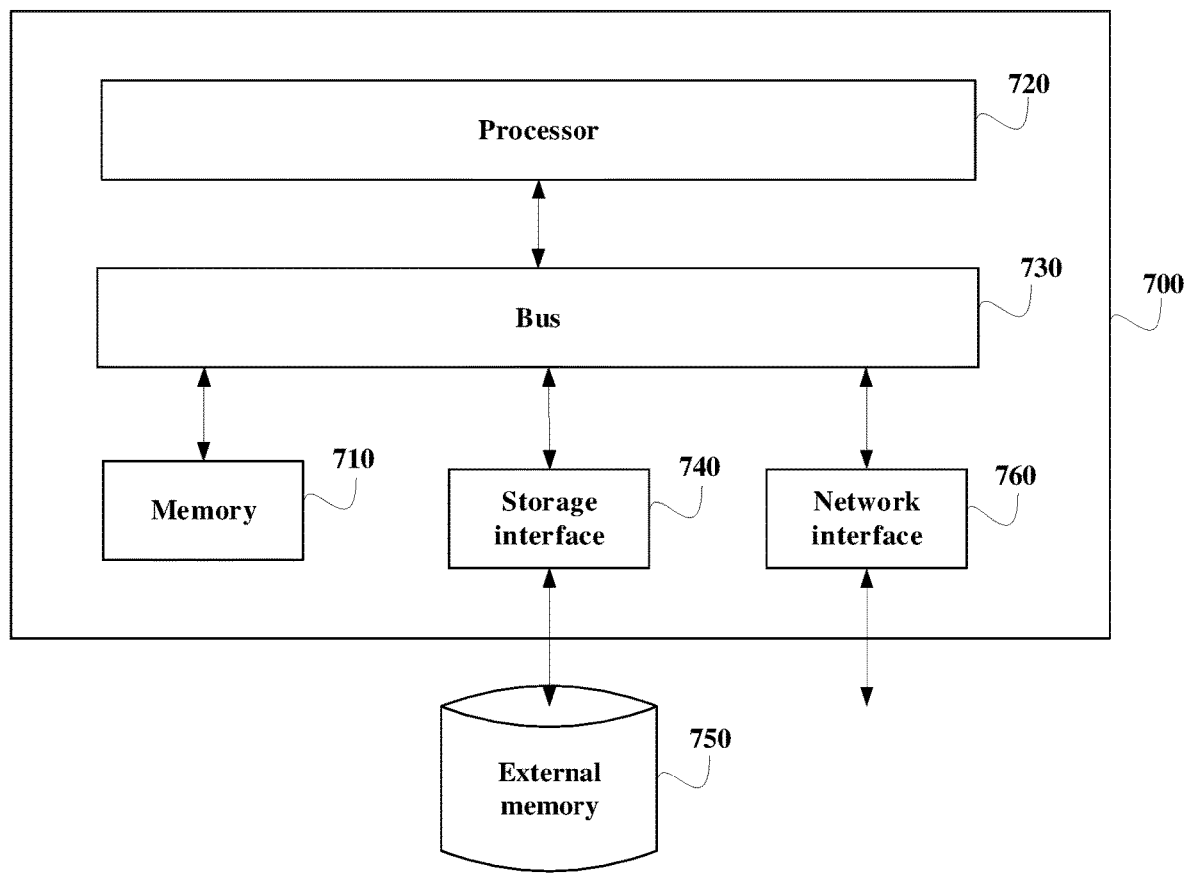
FIG. 7 is a schematic structural diagram showing a data processing device according to another embodiment of the present disclosure.

In some embodiments, as illustrated in FIG. 7, the data processing device 700 comprises a memory 710 and a processor 720. The processor 720 is coupled to the memory 710 via a bus 730. The data processing device 700 may be further connected to an external memory 750 through a storage interface 740 to access external data, and may be further connected to a network or another computer system (not shown) through a network interface 760, which will not be described in detail herein.

In this embodiment, through storing data and instructions in the memory and executing the above instructions by a processor, the display device is enabled to realize superimposed displaying of the human-machine interaction interface information and the video image during the display period, and to release the occupation of the memory by the human-machine interaction interface information during the non-display period, so that the power consumption of the data processing device during the non-display period is reduced without affecting the display of the human-machine interaction interface information.

In other embodiments, the present disclosure further provides a computer readable storage medium having computer program instructions stored thereon that, when executed by a processor, implement steps of the method of the embodiment corresponding to FIG. 5. One skilled in the art should understand that, the embodiments of the present disclosure may be provided as a method, an apparatus, or a computer program product. Therefore, embodiments of the present disclosure can take the form of an entirely hardware embodiment, an entirely software embodiment or an embodiment containing both hardware and software elements. Moreover, the present disclosure may take the form of a computer program product embodied on one or more computer-usable non-transitory storage media (comprising but not limited to disk storage, CD-ROM, optical memory, etc.) having computer-usable program code embodied therein.

The present disclosure is described with reference to flowcharts and/or block diagrams of methods, apparatuses (systems) and computer program products according to embodiments of the present disclosure. It should be understood that each process and/or block in the flowcharts and/or block diagrams, and combinations of the processes and/or blocks in the flowcharts and/or block diagrams may be implemented by computer program instructions. The computer program instructions may be provided to a processor of a general purpose computer, a special purpose computer, an embedded processor, or other programmable data processing apparatus to generate a machine such that the instructions executed by a processor of a computer or other programmable data processing apparatus to generate means for implementing the functions specified in one or more flows of the flowcharts and/or one or more blocks of the block diagrams.

The computer program instructions may also be stored in a computer readable memory device capable of directing a computer or other programmable data processing apparatus to operate in a specific manner such that the instructions stored in the computer readable memory device produce an article of manufacture comprising instruction means implementing the functions specified in one or more flows of the flowcharts and/or one or more blocks of the block diagrams.

These computer program instructions can also be loaded onto a computer or other programmable data processing apparatus to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

Heretofore, various embodiments of the present disclosure have been described in detail. In order to avoid obscuring the concepts of the present disclosure, some details known in the art are not described. Based on the above description, those skilled in the art can understand how to implement the technical solutions disclosed herein.

Although some specific embodiments of the present disclosure have been described in detail by way of example, those skilled in the art should understand that the above examples are only for the purpose of illustration and are not intended to limit the scope of the present disclosure. It should be understood by those skilled in the art that the above embodiments may be modified or equivalently substituted for part of the technical features without departing from the scope and spirit of the present disclosure. The scope of the disclosure is defined by the appended claims.

What is claimed is:

1. A data processing device, comprising:
a write controller configured to write video image data and human-machine interaction interface information into a memory;
a first read controller configured to read the video image data from the memory;
a second read controller configured to read the human-machine interaction interface information from the memory;
a superimposer configured to superimpose the video image data received from the first read controller and the human-machine interaction interface information received from the second read controller to obtain target image information;
a command controller configured to control the write controller to write the human-machine interaction interface information into the memory and turn on the superimposer after receiving a turn-on command, and control the write controller to stop writing the human-machine interaction interface information into the memory and turn off the superimposer after receiving a turn-off command;
a first timing generator configured to generate a first timing control signal for controlling a read operation of the first read controller; and
a second timing generator configured to generate a second timing control signal for controlling a read operation of the second read controller;
wherein the command controller comprises:
a command detection module configured to receive the turn-on command and output a turn-on signal;
a first counter configured to count a frame synchronization signal of the human-machine interaction interface information in a first count manner and control the write controller to write the human-machine interaction interface information into the memory according to a first count value in response to the turn-on signal; and
a second counter configured to count a frame synchronization signal of the first timing control signal in a second count manner and turn on the second timing generator and the superimposer according to the first count value received from the first counter and a second count value in response to the turn-on signal;
wherein the command detection module is further configured to receive the turn-off command and output a turn-off signal;
the first counter is further configured to count the frame synchronization signal of the human-machine interaction interface information in a third count manner and control the write controller to stop writing the human-machine interaction interface information into the memory according to a third count value in response to the turn-off signal; and
the second counter is further configured to count the frame synchronization signal of the first timing control signal in a fourth count manner and turn off the second timing generator and the superimposer according to a fourth count value in response to the turn-off signal.

2. The data processing device according to claim 1, wherein the superimposer is further configured to delay the video image data by a predetermined time to align time of the video image data with time of the human-machine interaction interface information, and superimpose delayed video image data and the human-machine interaction interface information in the superimposing of the video image data and the human-machine interaction interface information.

3. The data processing device according to claim 1, wherein the write controller comprises:
a first write controller configured to write the video image data into the memory; and
a second write controller configured to write the human-machine interaction interface information into the memory.

4. The data processing device according to claim 3, wherein:
the first counter is configured to turn on the second write controller when the first count value is a first preset value, and turn off the second write controller when the third count value is a second preset value; and
the second counter is configured to turn on the second timing generator and the superimposer when the first count value is greater than the first preset value and the second count value changes, and turn off the second timing generator and the superimposer when the fourth count value is a third preset value.

5. The data processing device according to claim 3, further comprising:
a first receiving module configured to receive the video image data and transmit the video image data to the first write controller;
a second receiving module configured to receive the human-machine interaction interface information, transmit the human-machine interaction interface information to the second write controller, and transmit the frame synchronization signal of the human-machine interaction interface information to the first counter; and
a third receiving module configured to receive the turn-on command or the turn-off command and transmit the turn-on command or the turn-off command to the command detection module.

6. The data processing device according to claim 1, wherein the first count manner is the same as the second count manner, the third count manner is the same as the fourth count manner, and the first count manner is opposite to the third count manner.

7. The data processing device according to claim 1, further comprising:
a sending module configured to send the target image information to a display panel.

8. A display device, comprising: a data processing device according to claim 1.

9. A control method for a data processing device, comprising:
controlling a write controller to write human-machine interaction interface information into a memory and turning on a superimposer, by a command controller, after receiving a turn-on command;
reading video image data from the memory by a first read controller;
reading the human-machine interaction interface information from the memory by a second read controller;
superimposing the video image data received from the first read controller and the human-machine interaction interface information received from the second read controller to obtain target image information by a superimposer; and
controlling the write controller to stop writing the human-machine interaction interface information into the memory and turning off the superimposer, by the command controller, after receiving a turn-off command;
wherein the control method further comprises:
generating a first timing control signal for controlling a read operation of the first read controller by a first timing generator before reading the video image data from the memory by the first read controller; and
generating a second timing control signal for controlling a read operation of the second read controller by a second timing generator before reading the human-machine interaction interface information from the memory by the second read controller;
wherein the controlling of the write controller to write human-machine interaction interface information into a memory and the turning on of the superimposer, by the command controller, after receiving the turn-on command comprises: receiving the turn-on command and outputting a turn-on signal by a command detection module; counting a frame synchronization signal of the human-machine interaction interface information in a first count manner and controlling the write controller to write the human-machine interaction interface information into the memory according to a first count value, by a first counter, in response to the turn-on signal; and counting a frame synchronization signal of the first timing control signal in a second count manner and turning on the second timing generator and the superimposer according to the first count value received from the first counter and a second count value, by a second counter, in response to the turn-on signal;
wherein the controlling of the write controller to stop writing the human-machine interaction interface information into the memory and the turning off of the superimposer, by the command controller, after receiving the turn-off command comprises:
receiving the turn-off command and outputting a turn-off signal by the command detection module;
counting the frame synchronization signal of the human-machine interaction interface information in a third count manner and controlling the write controller to stop writing the human-machine interaction interface information into the memory according to a third count value, by the first counter, in response to the turn-off signal; and
counting the frame synchronization signal of the first timing control signal in a fourth count manner and turning off the second timing generator and the superimposer according to a fourth count value, by the second counter, in response to the turn-off signal.

10. The control method according to claim 9, wherein the superimposing of the video image data and the human-machine interaction interface information by the superimposer comprises:
delaying the video image data by a predetermined time to align time of the video image data with time of the human-machine interaction interface information, and superimposing delayed video image data and the human-machine interaction interface information, by the superimposer, in the superimposing of the video image data and the human-machine interaction interface information.

11. The control method according to claim 9, wherein the controlling of the write controller to write the human-machine interaction interface information into the memory comprises:
writing the video image data into the memory by a first write controller; and
writing the human-machine interaction interface information into the memory by a second write controller.

12. The control method according to claim 11, wherein:
the second write controller is turned on when the first count value is a first preset value, and the second write controller is turned off when the third count value is a second preset value, by the first counter; and
the second timing generator and the superimposer are turned on when the first count value is greater than the first preset value and the second count value changes, and the second timing generator and the superimposer are turned off when the fourth count value is a third preset value, by the second counter.

13. A data processing device, comprising:
a memory; and
a processor coupled to the memory, the processor configured to, based on instructions stored in the memory, carry out the method according to claim 9.

14. A non-transitory computer readable storage medium on which computer program instructions are stored, which when executed by a processor implement the method according to claim 9.

* * * * *